United States Patent
Jo et al.

(10) Patent No.: US 10,763,493 B2
(45) Date of Patent: Sep. 1, 2020

(54) SILICON-BASED ACTIVE MATERIAL-POLYMER COMPOSITE AND METHOD FOR PREPARING SAME

(71) Applicant: LG Chem, Ltd., Seoul (KR)

(72) Inventors: Rae Hwan Jo, Daejeon (KR); Eun Kyung Kim, Daejeon (KR); Yong Ju Lee, Daejeon (KR); Su Jin Park, Daejeon (KR); Hyun Chul Kim, Daejeon (KR); Jung Hyun Choi, Daejeon (KR)

(73) Assignee: LG Chem, Ltd. (KR)

( * ) Notice: Subject to any disclaimer, the term of this patent is extended or adjusted under 35 U.S.C. 154(b) by 185 days.

(21) Appl. No.: 15/761,620

(22) PCT Filed: Mar. 8, 2017

(86) PCT No.: PCT/KR2017/002531
§ 371 (c)(1),
(2) Date: Mar. 20, 2018

(87) PCT Pub. No.: WO2017/155312
PCT Pub. Date: Sep. 14, 2017

(65) Prior Publication Data
US 2018/0351160 A1    Dec. 6, 2018

(30) Foreign Application Priority Data

Mar. 8, 2016 (KR) .................. 10-2016-0027782
Mar. 8, 2017 (KR) .................. 10-2017-0029453

(51) Int. Cl.
*H01M 4/134* (2010.01)
*H01M 4/36* (2006.01)
(Continued)

(52) U.S. Cl.
CPC .......... *H01M 4/134* (2013.01); *C01B 33/021* (2013.01); *H01M 4/1395* (2013.01);
(Continued)

(58) Field of Classification Search
CPC ... C01B 33/021; H01M 10/052; H01M 4/134; H01M 4/1395; H01M 4/362; H01M 4/364; H01M 4/386; H01M 4/623; H01M 4/624
See application file for complete search history.

(56) References Cited

U.S. PATENT DOCUMENTS

2009/0023065 A1    1/2009  Hwang et al.
2010/0136431 A1    6/2010  Lee et al.
(Continued)

FOREIGN PATENT DOCUMENTS

CN    102130323 A    7/2011
CN    102334218 A    1/2012
(Continued)

OTHER PUBLICATIONS

Extended European Search Report including Written Opinion for Application No. EP17763573.1 dated Sep. 3, 2018.
(Continued)

*Primary Examiner* — Lingwen R Zeng
(74) *Attorney, Agent, or Firm* — Lerner, David, Littenberg, Krumholz & Mentlik, LLP (57) ABSTRACT

The present invention relates to a silicon-based active material-polymer composite which is secondary particles in which silicon-based particles as primary particles and conductive polymer particles having a modulus of elasticity of 10 Pa to 100 Pa at a temperature of 20° C. to 40° C. are uniformly mixed. The uniform mixture with the elastic
(Continued)

conductive polymer particles provides for a buffering action against the stress generated by volumetric changes of the silicon-based particles.

19 Claims, 1 Drawing Sheet

(51) Int. Cl.
| | |
|---|---|
| *H01M 10/052* | (2010.01) |
| *H01M 4/62* | (2006.01) |
| *H01M 4/38* | (2006.01) |
| *C01B 33/021* | (2006.01) |
| *H01M 4/1395* | (2010.01) |

(52) U.S. Cl.
CPC .......... *H01M 4/362* (2013.01); *H01M 4/364* (2013.01); *H01M 4/386* (2013.01); *H01M 4/623* (2013.01); *H01M 4/624* (2013.01); *H01M 10/052* (2013.01)

(56) References Cited

U.S. PATENT DOCUMENTS

| | | |
|---|---|---|
| 2011/0311867 A1 | 12/2011 | Wakizaka et al. |
| 2012/0007028 A1* | 1/2012 | Hwang ................ H01M 4/134 252/503 |
| 2012/0295155 A1* | 11/2012 | Deng ..................... H01B 1/122 429/200 |
| 2014/0370378 A1 | 12/2014 | Liu |

FOREIGN PATENT DOCUMENTS

| | | |
|---|---|---|
| EP | 2843739 A1 | 3/2015 |
| EP | 2860802 A1 | 4/2015 |
| EP | 2869372 A1 | 5/2015 |
| EP | 2978051 A1 | 1/2016 |
| KR | 10-2009-0009053 A | 1/2009 |
| KR | 10-2011-0102844 A | 9/2011 |
| KR | 10-2015-0112746 A | 10/2015 |
| KR | 10-1558535 B | 10/2015 |

OTHER PUBLICATIONS

International Search Report for PCT/KR2017/002531, dated Jun. 12, 2017 (2 pages).

Zhou XY, Tang JJ, Yang J, Zou YL, Wang SC, Xie J, Ma LL. Effect of polypyrrole on improving electrochemical performance of silicon based anode materials. Electrochimica Acta. May 30, 2012;70:296-303.

Search Report from Chinese Office Action for Application No. 201780003450.8 dated Jun. 30, 2020; 2 pages.

* cited by examiner

SILICON-BASED ACTIVE MATERIAL-POLYMER COMPOSITE AND METHOD FOR PREPARING SAME

CROSS-REFERENCE TO RELATED APPLICATIONS

The present application is a national phase entry under 35 U.S.C. § 371 of International Application No. PCT/KR2017/002531 filed Mar. 8, 2017, published in Korean, which claims priority from Korean Patent Application Nos. 10-2016-0027782, filed Mar. 8, 2016, and 10-2017-0029453, filed Mar. 8, 2017, all of which are incorporated by reference in their entirety.

TECHNICAL FIELD

Technical Field

The present invention relates to a silicon-based active material-polymer composite and method for preparing the same, and more particularly, to a silicon-based active material-polymer composite which has a buffering effect against the stresses caused by volumetric changes of silicon-based particles such that the silicon-based particles and conductive polymer particles are uniformly mixed, and a method for preparing the same.

Background Art

As the technical development and demands for mobile apparatuses increase, the demand for a secondary battery as an energy source is being rapidly increased, and among such secondary batteries, a lithium secondary battery showing a high energy density and an operating voltage and having a long cycle life and a low self-discharge rate are commercialized and widely used.

In addition, recently, as the interest in environmental problems increases, various research have been carried out on electric vehicles (EV) and hybrid electric vehicles (HEV) which can substitute vehicles such as gas vehicles and diesel vehicles which use fossil fuels and which are one of the main causes of air pollution.

These electric vehicles (EV), hybrid electric vehicles (HEV), and the like use, as a power source, a nickel-metal hydride (Ni-MH) secondary battery or a lithium secondary battery having a high energy density, a high discharge voltage, and a high output stability. When the lithium secondary battery is used for an electric vehicle, the lithium secondary battery should have, in addition to a high energy density and a property of exhibiting a great output in a short time, durability for being used for 10 years or more even under severe conditions. Therefore, a far better energy density, stability, and long life characteristics than existing small-sized lithium secondary batteries are inevitably demanded.

Meanwhile, as a positive electrode active material constituting a positive electrode of the lithium secondary battery, a metal oxide such as $LiCoO_2$, $LiMnO_2$, $LiMn_2O_4$ or $LiCrO_2$ is being used, and as a negative electrode active material constituting a negative electrode of the lithium secondary battery, a metal such as metal lithium, a carbon-based material such as graphite or activated carbon, or silicon oxide ($SiO_x$) is being used. Among the negative electrode active materials, metal lithium is mainly used in the initial stage, but as charge and discharge cycles are repeated, a phenomena in which lithium atoms grow on the surfaces of the metal lithium, damage a separator, and break a battery, occurs. Thus, recently, carbon-based materials are mainly being used. However, the carbon-based materials have a drawback of having a small capacity such that theoretical capacity thereof is just approximately 400 mAh/g.

Accordingly, various research has been carried out to substitute the carbon-based material by using silicon (Si) having a high theoretical capacity of 4,200 mAh/g as a negative electrode active material. When lithium is inserted into silicon, the reaction formula is as follows.

$$22Li+5Si=Li_{22}Si_5 \quad \text{[Reaction formula 1]}$$

However, most silicon negative electrode active materials have drawbacks in that the volume of silicon is expanded up to a maximum of 300% by the insertion of lithium, and a negative electrode is thereby broken and cannot exhibit a high cycle characteristic. In addition, in the case of silicon, as cycles continue, volume expansion occurs due to the insertion of lithium, and a fading mechanism, such as pulverization, contact losses with conducing agents and a current collector, and a formation of unstable solid-electrolyte-interphase (SEI) may appear.

Accordingly, to solve such problems, research have been reported in which a structure-controlled silicon nanostructure such as nanowires, nonotubes, nonoparticles, and a composite formation of porous structures and carbon-based materials are used. For example, carbon-coated silicon nanostructures were studied, but a lithium secondary battery using this as a negative electrode active material had a drawback in that as charge and discharge cycles are repeated, the capacity of the negative electrode active material cannot be maintained. As another example, research on a synthesis of porous carbon-silicon composites has been carried out, but techniques for the composite synthesis exposes a limit due to problems of shape control technique for complicated structures, a high process cost, and the like. In addition, since silicon particles with nano sizes have very great specific surface areas, it is not easy to be changed into slurry when directly applied to an electrode, so that there are not only a limitation in that electrode is not easily manufactured but also a limitation in that an initial efficiency deterioration is caused by reactions between the electrolyte and the silicon particles due to the great specific surface areas of the silicon particles.

Thus, development of a silicon-containing composite and a method for manufacturing the same which can solve the above-mentioned limitations due to the conventional use of silicon is being demanded.

DISCLOSURE OF THE INVENTION

Technical Problem

An aspect of the present invention provides a silicon-based active material-polymer composite in which breakage of silicon-based particles may be suppressed through a buffering action against the stress generated by volumetric changes of the silicon-based particles, and a low electrical conductivity of the silicon-based particles may be supplemented.

Another aspect of the present invention provides a method for preparing the silicon-based active material-polymer composite.

Technical Solution

According to an aspect of the present invention, there is provided
a silicon-based active material-polymer composite which is secondary particles in which silicon-based particles as primary particles and conductive polymer particles are mixed, wherein the conductive polymer particles have a modulus of elasticity of 10 Pa to 100 Pa at a temperature of 20° C. to 40° C.

According to another aspect of the present invention, there is provided
a method for preparing the silicon-based active material-polymer composite, the method the steps of comprising:
(1) preliminarily adding, to silicon-based particles which are primary particles, a conductive polymer having a volumetric modulus of elasticity of 10 Pa to 100 Pa at a temperature of 20° C. to 40° C. and preparing a mixture of the silicon-based particles and the conductive polymer; and
(2) mechanically milling the mixture and preparing secondary particles in which the silicon-based particles and the conductive polymer are uniformly mixed.

Advantageous Effects

A silicon-based active material-polymer composite according to the present invention is secondary particles in which silicon-based particles as primary particles and conductive polymer particles are mixed. Since the silicon-based particles and the conductive polymer particles are uniformly mixed, breakage of the silicon-based particles may be suppressed through a buffering action against the stress generated by volumetric changes of the silicon-based particles, low electrical conductivity of the silicon-based particles may be supplemented, and by reducing a large specific surface area of the silicon-based particles, electrodes may be easily formed and the reactivity thereof with an electrolyte may be suppressed. Thus, the silicon-based active material-polymer composite may be helpfully used for preparing lithium secondary batteries.

MODE FOR CARRYING OUT THE INVENTION

Hereinafter, the present invention will be explained in more detail to assist the understanding of the present invention.

Terms or words used in the specification and claims should not be interpreted as limited to a commonly used meaning or a meaning defined dictionaries, and should be interpreted as having a meaning that is consistent with their meaning in the context of the technical idea of the invention, based on the principle that an inventor may properly define the meaning of the words or terms to best explain the invention.

A silicon-based active material-polymer composite according to the present invention is secondary particles formed by mixing silicon-based particles and conductive polymer particles which are primary particles.

The silicon-based active material-polymer composite according to the present invention may exhibit an effect in that: a silicon-based particle and a conductive polymer particle which are primary particles having smaller particle sizes form second particles having greater particle sizes, so that, the large specific surface area of the silicon-based particle is reduced and the reactivity of the secondary particles with an electrolyte can be suppressed, and an active material in slurry is easily dispersed due to the increased particle sizes of the secondary particles when manufacturing an electrode.

A silicon-based active material-polymer composite may include silicon-based particles and conductive polymer particles which are primary particles and uniformly mixed. In this case, the meaning of "uniformly mixed" is that any one component is mixed so as to have a relatively uniform content in all portions of the secondary particles, and the meaning not only includes the feature in which the silicon-based particle and the conductive polymer particle are completely mixed to form one secondary particle, but also the feature in which any one component particle of the silicon-based particle or the conductive polymer particle forms the skeleton of the secondary particle and the other component particle is uniformly distributed in pores included in the skeleton.

Accordingly, in an example of the present invention, the silicon-based particles may be positioned at pores formed by the conductive polymer particles. That is, the conductive polymer particles which are primary particles form composite particles which are secondary particles, and while the silicon-based particles are positioned at pores formed between the conductive polymer particles, the conductive polymer particles and the silicon-based particles may contact each other, and in this case, the particle sizes of the conductive polymer particles may be greater than the particle sizes of the silicon-based particles.

In addition, in an example of the present invention, the conductive polymer particles may be positioned at pores formed by the silicon-based particles. That is, the silicon-based particles which are the primary particles form composite particles which are the secondary particles, and while the conductive polymer particles are positioned at pores formed between the silicon-based particles, the conductive polymer particles and the silicon-based particles may contact each other, and in this case, the particle sizes of the silicon-based particles may be greater than the particle sizes of the conductive polymer particles.

The silicon-based particles may include one or more selected from the group consisting of Si, a silicon oxide particle ($SiO_x$, $0<x\leq2$), an Si-metal alloy, and an alloy of Si and a silicon oxide particle ($SiO_x$, $0<x\leq2$), and specifically, the silicon-based particles may include one or more selected from the group consisting of Si, a silicon oxide particle ($SiO_x$, $0<x\leq2$), and an alloy thereof. In this case, the silicon oxide particle ($SiO_x$, $0<x\leq2$) may be a composite including a crystalline $SiO_2$ and amorphous Si.

The average particle diameter (D50) of the silicon-based particles may be 5 nm to 30 μm, specifically, 10 nm to 20 μm, and more specifically, 50 nm to 5 μm.

The conductive polymer particles may be elastic conductive polymer particles. When the conductive polymer particles have elasticity, the conductive polymer particles may exhibit an effect in that the conductive polymer particles receive the stress generated by volumetric changes of the silicon-based particles, and perform a buffering action against the stress, and thus suppress the breakage of the silicon-based particles. In addition, since the conductive polymer particles have conductivity, the conductive polymer particles may contact the silicon-based particles and thus supplement the low electrical conductivity of the silicon-based particles.

The conductive polymer particles may have a volumetric modulus of elasticity of 10 Pa to 100 Pa at a temperature of 20° C. to 40° C., specifically, 20 Pa to 80 Pa, and more specifically, 40 Pa to 50 Pa.

When the conductive polymer particles have a volumetric modulus of elasticity of 10 Pa to 100 Pa at a temperature of 20° C. to 40° C., the stress caused by the volumetric change of the silicon-based primary particles included in the silicon-based active material-polymer composite which is secondary particles may be effectively absorbed. When the conductive polymer particles have an excessively small volumetric modulus of elasticity, the conductive polymer particles included in the silicon-based active material-polymer composite are difficult to appropriately maintain the elasticity thereof, and when the conductive polymer particles have an excessively great volumetric modulus of elasticity, the conductive polymer particles are difficult to effectively absorb the stress caused by the volumetric change of the silicon-based primary particles.

The conductive polymer particles may include, but not particularly limited to, general conductive polymers, for example, may include one or more selected from the group consisting of polypyrrole, polythiophene, polyaniline, polyacetylene, polyphenylene sulfide, polyphenylene vinylene, poly-indole, poly pyrene, polyvinyl carbazole, polyajulren, polyazepine, polyfluorene, and poly-naphthalene.

In this case, the polypyrrole, polythiophene, polyaniline, polyacetylene, polyphenylene sulfide, polyphenylene vinylene, poly-indole, poly pyrene, polyvinyl carbazole, polyajulren, polyazepine, polyfluorene, and poly-naphthalene may be or may not be substituted by one or more substitutent group selected from the group consisting of alkyl, alkenyl, alkynyl, alkanoyl, alkoxy, alkoxycarbonyl, alkylamino, alkylamino-carbonyl, dialkylamino carbonyl, alkylsulfonyl, alkylsulfinyl, sulfonylamino alkyl, alkylsulfonyl aminocarbonyl, aminoalkyl, cyanoalkyl, halogen, haloalkyl, haloalkenyl, haloalkynyl, haloalkanoyl, haloalkenoyl, haloalkynoyl, haloalkoxy, haloalkoxycarbonyl, hydroxyalkyl, oxoalkyl, cycloalkyl, aryl, arylalkyl, heteroarylalkyl, arylalkanoyl, heteroaryl-alkanoyl, arylalkennoyl, heteroarylalkenoyl, arylalkynoyl, heteroarylalkynoyl, arylalkoxy, heteroarylalkoxy, aryloxy, heteroaryloxy, aryloxy-carbonyl, heteroaryloxy-carbonyl, aryl alkoxycarbonyl, heteroaryl alkoxycarbonyl, and hydroxyl.

The average particle diameter (D50) of the conductive polymer particles may be 10 nm to 20 μm, specifically, 20 nm to 10 μm, and more specifically, 50 nm to 5 μm.

In an embodiment of the present invention, the silicon-based particles may be included in an amount of 5 parts by weight to 90 parts by weight with respect to 100 parts by weight of the silicon-based active material-polymer composite, specifically 10 parts by weight to 80 parts by weight, and more specifically 20 parts by weight to 60 parts by weight.

When the silicon-based particles include 5 parts by weight to 90 parts by weight with respect to 100 parts by weight of the silicon-based active material-polymer composite, an appropriate battery capacity may be exhibited, and the conductive polymer particles included together may appropriately buffer the volumetric change of the silicon-based particles.

In an embodiment of the present invention, the conductive polymer particles may be included in an amount of 10 parts by weight to 95 parts by weight with respect to 100 parts by weight of the silicon-based active material-polymer composite, specifically 20 parts by weight to 90 parts by weight, and more specifically 40 parts by weight to 80 parts by weight.

When the conductive polymer particles include more than 10 parts by weight with respect to 100 parts by weight of the silicon-based active material-polymer composite, the conductive polymer particles may appropriately buffer the volumetric change of the silicon-based particles, suppresses the breakage of the silicon-based particles, supplement and improve low electrical conductivity of the silicon-based particles, and when the conductive polymer particles include less than 95 parts by weight, an appropriate battery capacity may be exhibited.

The silicon-based particles and the conductive polymer particles may be mixed in a weight ratio of 5:95 to 90:10, specifically 10:80 to 80:20, and more specifically, 20:80 to 60:40.

When the silicon-based particles and the conductive polymer particles are mixed in a weight ratio of 5:95 to 90:10, a lithium secondary battery including the silicon-based active material-polymer composite may not only ensure a high battery capacity, but also appropriately suppress the volumetric change of the silicon-based particles which is the problem when the silicon-based particles are included, suppress the breakage of the silicon-based particles, and supplement and improve low electrical conductivity of the silicon-based particles.

The silicon-based active material-polymer composite may have an average particle diameter (D50) of 0.05 μm to 50 μm, specifically, 0.1 μm to 30 μm, and more specifically, 1 μm to 20 μm.

When the average particle diameter of the silicon-based active material-polymer composite is greater than or equal to 0.05 μm, the density of an electrode does not become excessively low and may have an appropriate capacity per volume, and when the average particle diameter is less than or equal to 50 μm, slurry for forming the electrode may appropriately be applied in a uniform thickness.

In the present invention, the average particle diameters (D50) of the silicon-based particles, the conductive polymer particles, and the silicon-based active material-polymer composite may be defined as a particle diameter at a reference of 50% of the particle diameter distribution. The average particle diameter may be measured by using, but not particularly limited to, a laser diffraction method or a photograph of a scanning electron microscope (SEM). The laser diffraction method may measure particle diameters of a degree from a submicron range up to several mm, and may obtain a result having high repeatability and resolution.

In the silicon-based active material-polymer composite, any one component particles among the silicon-based particles and the conductive polymer particles form a skeleton of secondary particles, and the other component particles are uniformly distributed in pores included in the skeleton.

The silicon-based active material-polymer composite may have a specific surface area of 0.5 $m^2/g$ to 100 $m^2/g$, specifically 1 $m^2/g$ to 50 $m^2/g$, and more specifically, 2 $m^2/g$ to 10 $m^2/g$.

As such, the silicon-based active material-polymer composite according to an embodiment of the present invention has a specific surface area of 0.5 $m^2/g$ to 100 $m^2/g$, and has a specific surface area smaller than the very large specific surface area of the silicon-based particles which is the primary particles, and may therefore suppress the difficulty in making slurry caused by the very large specific surface area of the silicon-based particles, which is the primary particles, and prevents an initial efficiency decrease due to a reaction with the electrolyte.

In addition, the present invention provides a method for preparing the silicon-based active material-polymer composite.

A method for preparing the silicon-based active material-polymer composite includes the steps of: (1) preliminarily adding, to silicon-based particles which are primary particles, a conductive polymer having a volumetric modulus of elasticity of 10 Pa to 100 Pa at a temperature of 20° C. to 40° C. and preparing a mixture of the silicon-based particles and the conductive polymer; and (2) mechanically milling the mixture and preparing secondary particles in which the silicon-based particles and the conductive polymer are uniformly mixed.

In step (1), the conductive polymer is preliminarily added to the silicon-based particles, which are the primary particles, and thus, a mixture of the silicon-based particles and the conductive polymer are prepared.

The silicon-based particles may be the primary particles having average particle diameters (D50) of 50 nm to 30 μm, specifically, 10 nm to 20 μm, and more specifically, 50 nm to 5 μm, and preliminarily mixed with the conductive polymer.

In step (1), the conductive polymer may be conductive polymer particles having particle shapes, or alternatively, may also be a conductive polymer which does not have a particle shape.

In this case, when the conductive polymer is conductive polymer particles, the conductive polymer particles may have average particle diameters (D50) of 10 nm to 20 μm, specifically, 20 nm to 10 μm, and more specifically, 50 nm to 5 μm.

In step (2), the mixture prepared in step (1) is mechanically milled to prepare the secondary particles in which the silicon-based particles and the conductive polymer are uniformly mixed.

Through the mechanical milling, the silicon-based particles and the conductive polymer included in the mixture are uniformly mixed, and the silicon-based particle and the conductive polymer may be completely mixed to form one secondary particle, or any one component particles among the silicon-based particles and the conductive polymer may form a skeleton of the secondary particles and the other component particles may be uniformly distributed in pores included in the skeleton.

The mechanical milling may be performed by mechanically rubbing the silicon-based particles and the conductive polymer by using a roll mill, a ball-mill, a high-energy ball mill, a planetary mill, a stirred ball mill, a vibrating mill, or a jet mill, for example, by rotating the silicon-based particles and the conductive polymer at a speed of 100 rpm to 1,000 rpm and thereby mechanically applying a compressive stress.

In this case, when the conductive polymer which has been preliminarily added in step (1) is a conductive polymer which does not have a particle shape, the conductive polymer may have a particle shape through the milling in step (2), and the conductive polymer particles having the particle shapes through the milling may have average particle diameters (D50) of 10 nm to 20 μm, specifically, 20 nm to 10 μm, and more specifically, 50 nm to 5 μm.

In addition, the present invention provides a negative electrode active material which is for a lithium secondary battery and includes the silicon-based active material-polymer composite prepared through the method for preparing the silicon-based active material-polymer composite, and a lithium secondary battery including the negative electrode active material.

The lithium secondary battery may include a positive electrode, a negative electrode, and a separator interposed between the positive electrode and the negative electrode.

The negative electrode may be prepared such that negative electrode active material slurry is prepared by adding and stirring the negative electrode active material and additives such as a binder and a conductor, and then the resultant is applied onto a negative electrode current collector and then dried and compressed.

The binder is not particularly limited as long as it is only a general binder used when preparing negative electrode active material slurry, and for example, a non-aqueous binder such as PVdF (polyvinylidene fluoride), polyvinyl alcohol, carboxymethyl cellulose, hydroxyethyl propylene cellulose, diacetylene cellulose, polyvinylchloride, polyvinylpyrrolidone, polytetrafluoroethylene, polyvinylidene fluoride, polyethylene, or polypropylene, may be used, and as an aqueous binder, any one selected from the group consisting of acrylonitrile-butadiene rubber, styrene-butadiene rubber, and acrylic rubber, or a mixture of two or more thereof may be used.

The binder may be included, with respect to the total weight of the negative electrode active material slurry, in an amount of 10 wt % or less, and specifically, 0.1 wt % to 10 wt %. When the content of the binder is less than 0.1 wt %, the effect of the use of the binder is unfavorably small, and when the content of the binder is greater than 10 wt %, there is a concern that the capacity per volume unfavorably decrease due to a relative decrease in the content of active material according to the increase in the content of the binder.

Such a conductor may be, but not particularly limited to, a material having conductivity without causing a chemical change in the battery, for example, may be: a graphite such as natural graphite or artificial graphite; a carbon black such as acetylene black, Ketjen black, channel black, furnace black, lamp black, or thermal black; a conductive fiber such as a carbon fiber or a metal fiber; metal powder such as fluorocarbon, aluminum powder, or nickel powder; a conductive whisker such as zinc oxide or potassium titanate; a conductive metal oxide such as titanium oxide; a polyphenylene derivative; or the like. The conductor may be used in an amount of 1 wt % to 9 wt % with respect to the total weight of the negative electrode active material slurry.

The negative electrode current collector used for the negative electrode according to an embodiment of the present invention may have a thickness of 3 μm to 500 μm. The negative electrode current collector is not particularly limited if only having conductivity without causing a chemical change to the negative electrode, and for example, copper, stainless steel, aluminum, nickel, titanium, sintered carbon, a material in which the surface of copper or stainless steel is treated with carbon, nickel, titanium, silver, or the like, an aluminum-cadmium alloy, or the like may be used for the negative electrode current collector. In addition, fine protrusions and recesses may also be formed on the surface of the current collector to reinforce the binding force of the negative electrode active material, and the current collector may be used in various shapes, such as films, foils, nets, porous bodies, foamed bodies, nonwoven fabric bodies.

The positive electrode may be prepared through a general method well-known in the art. For example, the positive electrode may be prepared such that a solvent, and if necessary, a binder, a conductor, and a dispersant are added and stirred to a positive electrode active material and slurry is thereby prepared, and the resultant is then applied (coated) to a current collector made of metal, compressed, and then dried.

The current collector made of metal is not particularly limited if only being a metal to which the positive electrode active material slurry can be easily adhered, and which has high conductivity without causing a chemical change to the battery within the voltage range of the battery. For example, stainless steel, aluminum, nickel, titanium, sintered carbon, a material in which the surface of aluminum or stainless steel is treated with carbon, nickel, titanium, silver, or the like, may be used for the current collector. In addition, fine protrusions and recesses may also be formed on the surface of the current collector to increase the adhering force of the positive electrode active material. The current collector may be used in various shapes, such as films, foils, nets, porous bodies, foamed bodies, nonwoven fabric bodies, and may have a thickness of 3 μm to 500 μm.

The positive electrode active material may include, for example, a laminated compound such as: a lithium cobalt oxide ($LiCoO_2$); a lithium nickel oxide ($LiNiO_2$); $Li[Ni_aCo_bMn_cM^1_d]O_2$ (in the formula, $M^1$ is any one selected from the group consisting of Al, Ga and In, or two or more thereof, and $0.3 \le a < 1.0$, $0 \le b \le 0.5$, $0 \le c \le 0.5$, $0 \le d \le 0.1$, $a+b+c+d=1$); $Li(Li_eM^2_{f-e-f}M^3_f)O_2-_gA_g$ (in the formula, $0 \le e \le 0.2$, $0.6 \le f \le 1$, $0 \le f' \le 0.2$, $0 \le g \le 0.2$, and $M^2$ includes one or more selected from the group consisting of Mn, Ni, Co, Fe, Cr, V, Cu, Zn and Ti, $M^3$ is one or more selected from the group consisting of Al, Mg and B, and A is one or more selected from the group consisting of P, F, S and N); or the like; or a compound thereof substituted by one or more transition metals; a lithium manganese oxide such as $Li_{1+h}Mn_{2-h}O_4$ (in the formula, $0 \le h \le 0.33$), $LiMnO_3$, $LiMn_2O_3$, $LiMnO_2$; a lithium copper oxide ($Li_2CuO_2$); a vanadium oxide such as $LiV_3O_8$, $V_2O_5$, $Cu_2V_2O_7$; a Ni site-type lithium nickel oxide represented by a formula $LiNi_{1-i}M^4_iO_2$ (in the formula, $M^4$ is Co, Mn, Al, Cu, Fe, Mg, B or Ga, $0.01 \le i \le 0.3$); a lithium manganese composite oxide represented by a formula $LiMn_{2-j}M^5_jO_2$ (in the formula, $M^5$=Co, Ni, Fe, Cr, Zn or Ta, and $0.01 \le j \le 0.1$) or $Li_2Mn_3M^6O_8$ (in the formula, $M^6$=Fe, Co, Ni, Cu or Zn); $LiMn_2O_4$ in which some Li is substituted by alkali earth metal ions; a disulfide compound; $LiFe_3O_4$, $Fe_2(MoO_4)_3$; or the like, but embodiments are limited thereto.

The solvent for forming the positive electrode may be an organic solvent, such as N-methylpyrrolidone (NMP), dimethyl formamide (DMF), acetone, and dimethyl acetamide, or water, and the solvent may be individually used or used as a combination of two or more solvents. Considering applying thickness and preparing yield of slurry, the amount of using the solvent may be sufficient if the amount is a degree that can dissolve and disperse the positive active material, the binder, and the conductor.

As the binder, various binder polymer such as: polyvinylidene fluoride-hexafluoropropylene copolymer (PVdF-co-HFP), polyvinylidene fluoride, polyacrylonitrile, polymethylmethacrylate, polyvinylalcohol, carboxymethyl cellulose (CMC), starch, hydroxypropylcellulose, regenerated cellulose, polyvinylpyrrolidone, tetrafluoroethylene, polyethylene, polypropylene, polyacrylic acid, ethylene-propylene-diene monomer (EPDM), sulfonated EPDM, styrene butadiene rubber (SBR), fluoro rubber, and polyacrylic acid; and a polymer, in which hydrogen thereof is substituted by Li, Na, Ca, or the like; and various copolymers thereof; may be used.

Such a conductor may be, but not particularly limited to, a material having conductivity without causing a chemical change in the battery, for example, may be: a graphite such as natural graphite or artificial graphite; a carbon black such as acetylene black, Ketjen black, channel black, furnace black, lamp black, or thermal black; a conductive fiber such as carbon fiber or metal fiber; metal powder such as fluorocarbon, aluminum powder, or nickel powder; a conductive whisker such as zinc oxide or potassium titanate; a conductive metal oxide such as titanium oxide; a polyphenylene derivative; or the like. The conductor may be used in an amount of 1 wt % to 20 wt % with respect to the total weight of the positive electrode active material slurry.

As the dispersant, an aqueous dispersant or an organic dispersant such as N-methyl-2-pyrrolidone may be used.

As the separator, a porous polymer film conventionally used as a separtor, for example, a porous polymer film made of a polyolefin-based polymer such as ethylene homopolymer, propylene homopolymer, ethylene-butene copolymer, ethylene-hexene copolymer and ethylene-methacrylate copolymer may be used alone or used such that two or more porous films are stacked. Alternatively, a general nonwoven fabric such as a nonwoven fabric made of glass fiber, polyethylene terephthalate fiber, or the like which have high melting points, may be used, but embodiments are not limited thereto.

As a lithium salt which may be included as an electrolyte in the present invention, a lithium salt generally used as the electrolytes for lithium secondary batteries may be used without limitation. For example, a negative ion of the lithium salt may be any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

The electrolyte used in the present invention may be organic liquid electrolytes which can be used in the manufacture of lithium secondary batteries, an inorganic liquid electrolytes, solid polymer electrolytes, gel polymer electrolytes, solid inorganic electrolytes, or melting-type inorganic electrolyte, or the like, but embodiments are not limited thereto.

The outer shape of the lithium secondary battery of the invention may be, but not particularly limited to, a cylindrical shape using a can, a prismatic shape, a pouch shape, a coin shape, or the like.

The lithium secondary battery according to the present invention may be not only used for the battery cell used as a power source of the compact device but also preferably be used as a unit cell in the middle- or large-sized battery module including a plurality of battery cells.

Preferred examples of the middle- or large-sized devices may be, but not limited to, an electric vehicle, a hybrid electric vehicle, a plug-in hybrid electric vehicle, a power storage system, or the like.

MODE FOR CARRYING OUT THE INVENTION

Example

Hereinafter, in order to illustrate the present invention in detail, a more detailed description will be provided with examples and experimental examples, but the present invention is not limited by these examples and experimental examples. Examples according to the present invention may be modified in various forms, and the scope of the present invention should not to be construed as limited to the examples to be described below. Examples of the present invention will be provided to those skilled in the art to more fully explain the invention.

Example 1: Preparing of Silicon-Based Active Material-Polymer Composite

Silicon nanoparticles (from KCC Korea) having an average particle diameter of 70 nm, and as a conductive polymer, particle-shaped polythiophene (from Sigma-Aldrich) having an average particle diameter of 100 nm and a volumetric modulus of elasticity of 50 Pa (at 25° C.) were lightly mixed with a mass ratio of 60:40 and thus, a mixture of the silicon-based particles and the conductive polymer was prepared.

The mixture was mechanically milled by using a rotating-type ball mill.

The mechanical milling was performed under an Ar gas atmosphere by using a stainless steel mill container with the inner diameter of 70 mm and the length of 100 mm and stainless steel balls with diameters of 6 mm while the amount of charged balls was 50% of the volume of the mill container and the charging ratio of the balls to powder was 50:1.

The mechanical milling was performed for 24 hours and 100 hours and a silicon-based active material-polymer composite was prepared.

Example 2: Preparing of Silicon-Based Active Material-Polymer Composite

A silicon-based active material-polymer composite was prepared using the same method as Example 1 except that particle-shaped polythiophene (from Sigma-Aldrich) having an average particle diameter of approximately 100 nm and a volumetric modulus of elasticity of 25 Pa (at 25° C.) was used as a conductive polymer.

Example 3: Preparing of Silicon-Based Active Material-Polymer Composite

A silicon-based active material-polymer composites were prepared using the same method as Example 1 except that particle-shaped polythiophene (from Sigma-Aldrich) having an average particle diameter of approximately 100 nm and a volumetric modulus of elasticity of 90 Pa (at 25° C.) was used as a conductive polymer.

Example 1-1: Manufacturing of Half Coin Cell

The silicon-based active material-polymer composite prepared in Example 1 as a negative electrode active material, carbon as a conductor, and polyvinylidenefluoride (PVdF) as a binder, were mixed with a weight ratio of 90:3:7, the resultant was then added to N-methyl-2-pyrrolidone as a solvent, and thus slurry was prepared. The prepared slurry was applied in a thickness of 180 μm on one surface of a copper current collector, the resultant was then rolled and dried in a vacuum oven at 130° C. for 6 hours or more, and thus, a negative electrode was prepared.

An electrochemical cell was prepared by using the negative electrode prepared as described above. As a counter electrode, a lithium metal foil was used.

As an electrolyte, $LiPF_6$ was added to a non-aqueous electrolytic solvent prepared by mixing ethylene carbonate and diethyl carbonate with a volume ratio of 1:1 to thereby prepare 1M of $LiPF_6$ non-aqueous electrolytic solution, and then a half coin cell was manufactured in a glove box under an argon atmosphere.

Examples 2-1 and 3-1: Manufacturing of Half Coin Cell

A half coin cell was manufactured by using the same method as the Example 1-1 except that the silicon-based active material-polymer composites respectively prepared in Examples 2 and 3 were used as a negative electrode active material instead of the silicon-based active material-polymer composite prepared in Example 1.

Comparative Example 1: Manufacturing of Half Coin Cell

A half coin cell was manufactured by using the same method as the Example 1-1 except that a mixture in which silicon nanoparticles (from KCC Korea) having an average particle diameter of 70 nm and natural graphite having the average particle diameter of 15 μm were mixed with a mass ratio of 50:50 was used as a negative electrode active material instead of the silicon-based active material-polymer composite prepared in Example 1.

Comparative Example 2: Manufacturing of Half Coin Cell

A reaction mixture was prepared by mixing 60 g of styrene, 40 g of divinylbenzene, 20 g of carbon black, 60 g of silicon powder (average particle diameter 2 μm), 100 g of cyclohexane, and 1 g of azobisisobutyronitrile.

The mixture was added into an aqueous dispersion which was prepared by adding 510 mL of 0.1 M sodium phosphate solution and 75 mL of 1 M calcium chloride solution to 1 liter of distilled water, was then homogenized by using a homogenizer, and then was allowed to react for one day at 70° C. under stirring.

After the reaction was finished, the pH of the reaction bath was set to 1, and then the reactant was filtered by using a filter. The resultant was washed with distilled water, and then dried in a vacuum oven to obtain silicon-based active material-polymer composite particles. The average particle diameter of the silicon-based active material-polymer composite particles was approximately 10 μm.

Subsequently, a half coin cell was manufactured using the same method as Example 1-1 except that the silicon-based active material-polymer composite particles were used as a negative electrode active material.

Comparative Example 3: Manufacturing of Half Coin Cell

A silicon-based active material-polymer composite was prepared using the same method as Example 1 except that particle-shaped polythiophene (from Sigma-Aldrich) having an average particle diameter of approximately 100 nm and a volumetric modulus of elasticity of 5 Pa (at 25° C.) was used as a conductive polymer.

Subsequently, a half coin cell was manufactured using the same method as Example 1-1 except that the obtained silicon-based active material-polymer composite particles were used as a negative electrode active material.

Comparative Example 4: Manufacturing of Half Coin Cell

A silicon-based active material-polymer composite was prepared using the same method as Example 1 except that particle-shaped polythiophene (from Sigma-Aldrich) having an average particle diameter of approximately 100 nm and a volumetric modulus of elasticity of 200 Pa (at 25° C.) was used as a conductive polymer.

Subsequently, a half coin cell was manufactured using the same method as Example 1-1 except that the obtained silicon-based active material-polymer composite particles were used as a negative electrode active material.

Experimental Example 1: Electrochemical Characteristic Evaluation

In order to investigate relative efficiency according to the number of cycles with respect to half batteries respectively obtained from Examples 1-1 to 3-1 and Comparative examples 1 to 4, electrochemical evaluation experiment was performed as follows.

With respect to each of the half coin cells, 50 cycles of charge and discharge were performed at 0.01 V to 1.5 V with 0.1 C, and the discharge capacity and coulomb efficiency were measured. Meanwhile, the capacities after 1 cycle and 50 cycles were compared and the capacity maintaining rate after 50 cycles were measured. The results were respectively shown in Table 1 and FIGS. 1 and 2.

In addition, the thickness of the negative electrode of the fully charged battery after 1 cycle, and the thickness of the negative electrode of the fully charged battery after 50 cycles were respectively measured and a negative electrode expansion rate was calculated according to Equation 1 below.

Thickness expansion rate (%)=[(thickness of negative electrode of fully charged battery after 50 cycles−thickness of negative electrode of fully charged battery after 1 cycle)/(thickness of negative electrode of fully charged battery after 1 cycle−thickness of copper current collector)]× 100     [Equation 1]

The results were shown together in Table 1 below.

TABLE 1

|  | Discharge capacity (mAh/g) | Initial efficiency (%) | Capacity maintaining rate after 50 cycles (%) | Negative electrode expansion rate (%) |
|---|---|---|---|---|
| Example 1-1 | 1797 | 84.8 | 86 | 283 |
| Example 2-1 | 1735 | 84.5 | 71 | 331 |
| Example 3-1 | 1741 | 84.9 | 65 | 318 |
| Comparative example 1 | 1755 | 76.5 | 31 | 486 |
| Comparative example 2 | 1743 | 74.5 | 35 | 501 |
| Comparative example 3 | 1023 | 48.3 | 44 | 467 |
| Comparative example 4 | 1801 | 84.3 | 35 | 454 |

Figure 1:
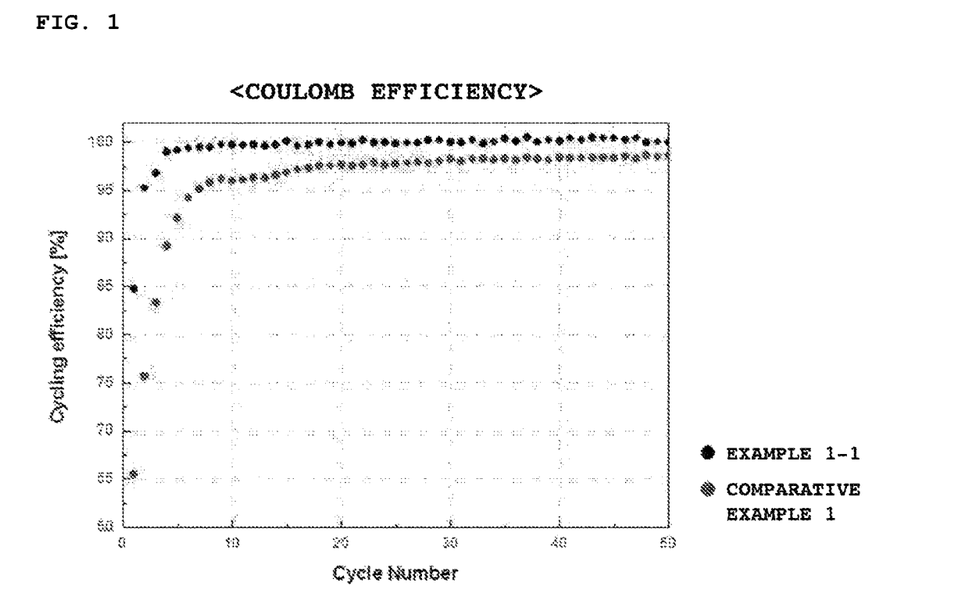
FIG. 1 is a view illustrating measured results of coulomb efficiency of half coin cells respectively obtained from example 1-1 and comparative example 1.
Figure 2:
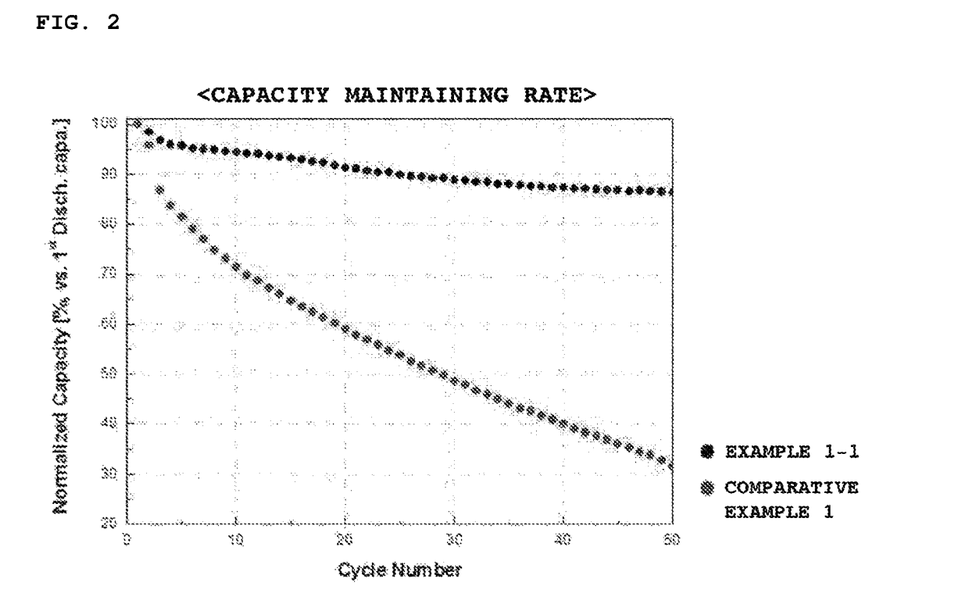
FIG. 2 is a view illustrating measured results of capacity maintaining rates of half coin cells respectively obtained from example 1-1 and comparative example 1.

Referring to the results in Table 1 and FIGS. 1 and 2, since the half coin cells according to Examples 1-1 to 3-1 respectively include silicon-based active material-polymer composites of Examples 1 to 3, initial efficiency decreases caused by the reaction with the electrolyte due to the high specific surface area of silicon-based particles are substantially suppressed, and thus, it may be confirmed that remarkably higher initial efficiency than the half coin cells of Comparative examples 1 to 4 which include, as negative active materials, silicon-based particles and graphite is exhibited.

In addition, while the half coin cells of Comparative examples 1 to 4 exhibit a very low capacity and a high negative electrode expansion rate after 50 cycles because a volume expansion problem occurs due to the reaction between the silicon-based active material and the electrolytic solution, the half coin cells of Examples 1-1 to 3-1 maintain a high capacity and exhibit relatively very low negative electrode expansion rate even after 50 cycles because of respectively including silicon-based active material-polymer composites of Examples 1 to 3. Thus, it may be understood that the silicon-based active material-polymer composite according to an embodiment of the present invention may substantially solve the problem caused by the specific surface area of the silicon-based active material.

Meanwhile, in the case of half coin cells of Comparative examples 3 and 4, only the volumetric moduli of elasticity of used conductive polymers differ from those of the silicon-based active material-polymer composites of Examples 1 to 3, but due to the difference in volumetric modulus of elasticity, the capacity maintaining rate and the negative electrode expansion rate show differences. Thus, it may be confirmed that the conductive polymers are required to satisfy a volumetric modulus of elasticity within a specific range.

The invention claimed is:

1. A silicon-based active material-polymer composite which is secondary particles in which silicon-based particles as primary particles and conductive polymer particles are mixed, wherein the conductive polymer particles have a modulus of elasticity of 10 Pa to 100 Pa at a temperature of 20° C. to 40° C.

2. The silicon-based active material-polymer composite of claim 1, wherein the silicon-based particles are positioned at pores formed by the conductive polymer particles.

3. The silicon-based active material-polymer composite of claim 1, wherein the conductive polymer particles are positioned at pores formed by the silicon-based particles.

4. The silicon-based active material-polymer composite of claim 1, wherein the silicon-based particles comprises one or more selected from the group consisting of Si, silicon oxide particles ($SiO_x$, $0<x\leq2$), an Si-metal alloy, and an alloy of Si and silicon oxide particles ($SiO_x$, $0<x\leq2$).

5. The silicon-based active material-polymer composite of claim 1, wherein the silicon-based particles comprises one or more selected from the group consisting of Si, silicon oxide particles ($SiO_x$, $0<x\leq2$), and an alloy thereof.

6. The silicon-based active material-polymer composite of claim 5, wherein the silicon oxide particle ($SiO_x$, $0<x\leq2$) is a composite comprising crystalline $SiO_2$ and amorphous Si.

7. The silicon-based active material-polymer composite of claim 1, wherein an average diameter (D50) of the silicon-based particles is 5 nm to 30 μm.

8. The silicon-based active material-polymer composite of claim 1, wherein the conductive polymer particles comprises one or more selected from the group consisting of polypyrrole, polythiophene, polyaniline, polyacetylene, polyphenylene sulfide, polyphenylene vinylene, poly-indole, poly pyrene, polyvinyl carbazole, polyajulren, polyazepine, polyfluorene, and poly-naphthalene.

9. The silicon-based active material-polymer composite of claim 1, wherein an average diameter (D50) of the conductive polymer particles is 10 nm to 20 μm.

10. The silicon-based active material-polymer composite of claim 1, comprising 5 parts by weight to 90 parts by weight of the silicon-based particles with respect to 100 parts by weight of the silicon-based active material-polymer composite.

11. The silicon-based active material-polymer composite of claim 1, comprising 10 parts by weight to 95 parts by weight of the conductive polymer particles with respect to 100 parts by weight of the silicon-based active material-polymer composite.

12. The silicon-based active material-polymer composite of claim 1, wherein the silicon-based particles and the conductive polymer particles are mixed with a weight ratio of 5:95 to 90:10.

13. The silicon-based active material-polymer composite of claim 1, having a particle diameter of 0.05 μm to 50 μm.

14. The silicon-based active material-polymer composite of claim 1, having a specific surface area of 0.5 $m^2$/g to 100 $m^2$/g.

15. A method for preparing a silicon-based active material-polymer composite, the method comprising the steps of:
  (1) preliminarily adding, to silicon-based particles which are primary particles, a conductive polymer having a volumetric modulus of elasticity of 10 Pa to 100 Pa at a temperature of 20° C. to 40° C. and preparing a mixture of the silicon-based particles and the conductive polymer; and
  (2) mechanically milling the mixture and preparing secondary particles in which the silicon-based particles and the conductive polymer are uniformly mixed.

16. The method for preparing a silicon-based active material-polymer composite of claim 15, wherein in step (1), the conductive polymer is conductive polymer particles having an average particle diameter ($D_{50}$) of 10 nm to 20 μm.

17. The method for preparing a silicon-based active material-polymer composite of claim 15, wherein
  the conductive polymer mixed in the secondary particles prepared in step (2) has a particle shape through the mechanical milling, and the particle-shaped conductive polymer has an average particle diameter ($D_{50}$) of 10 μm to 20 μm.

18. A negative active material for a lithium secondary battery, the material comprising the silicon-based active material-polymer composite of claim 1.

19. A lithium secondary battery comprising a negative active material of claim 18.

* * * * *